109-83 SR
12/24/85 OR 4,559,881

United States Patent [19] Lankard et al.

[11] Patent Number: 4,559,881
[45] Date of Patent: Dec. 24, 1985

[54] BURGLARY RESISTANT STEEL FIBER REINFORCED CONCRETE CONSTRUCTION FOR VAULT WALLS AND DOORS AND MANUFACTURE THEREOF

[75] Inventors: David R. Lankard, Columbus; James D. Shoop, Canton, both of Ohio

[73] Assignee: Diebold, Incorporated, Canton, Ohio

[21] Appl. No.: 524,584

[22] Filed: Aug. 19, 1983

[51] Int. Cl.[4] .......... C04B 7/02; E04B 2/84

[52] U.S. Cl. .......... 109/83; 106/99; 106/DIG. 1

[58] Field of Search .......... 106/99, DIG. 1; 109/15, 109/78, 89, 80, 83; 52/659

[56] References Cited

U.S. PATENT DOCUMENTS

| | | | |
|---|---|---|---|
| 3,429,094 | 2/1969 | Romualdi | 52/659 |
| 4,274,881 | 6/1981 | Langton et al. | 156/99 |
| 4,377,977 | 3/1983 | Wurster | 109/83 |
| 4,388,874 | 6/1983 | Stone | 109/79 |
| 4,389,948 | 6/1983 | Sands | 109/80 |

*Primary Examiner*—Mark L. Bell
*Attorney, Agent, or Firm*—Ralph E. Jocke

[57] ABSTRACT

A new castable steel fiber reinforced concrete composition is described composed of Portland Cement, fly ash, fine aggregate, gravel or crushed stone, water, high range superplasticizing water-reducing admixture, and steel fibers. The concrete may be mixed in conventional mixers and cast in open top molds to form modular panels for use in the construction of security vaults. The cast panels have outstanding engineering properties resistant to burglarious attack measures such that multi-paneled vault walls resist burglarious attack as outlined in Underwriters Laboratories Standard No. 608 in thicknesses of 8 inches for 1 hour and 11 inches for 2 hours. New casting procedures for the concrete and new vault construction procedures using modular panels cast from the concrete also are described.

24 Claims, 24 Drawing Figures

FIG. 21
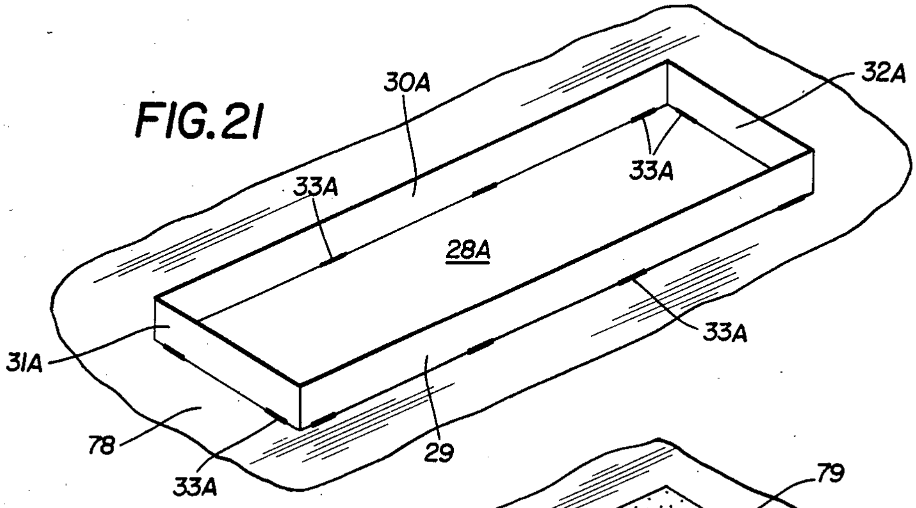
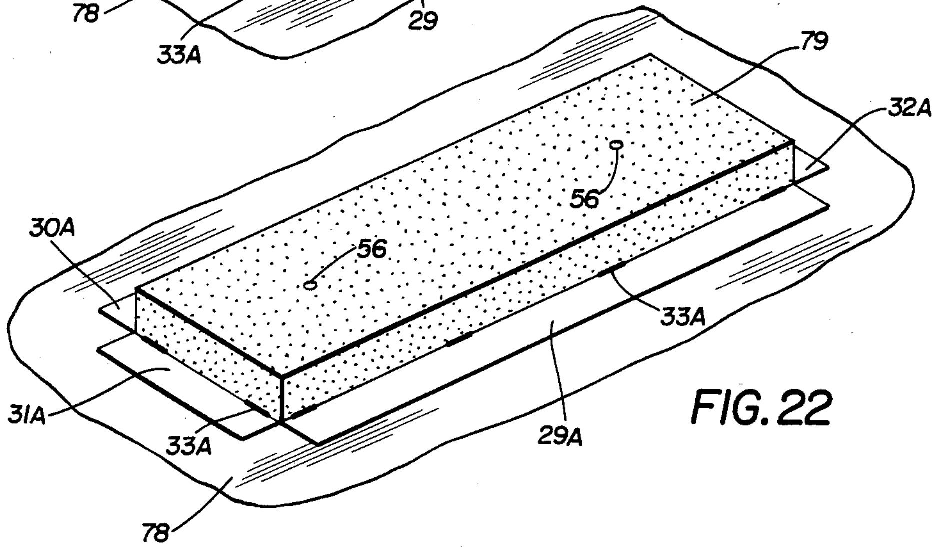
FIG. 22
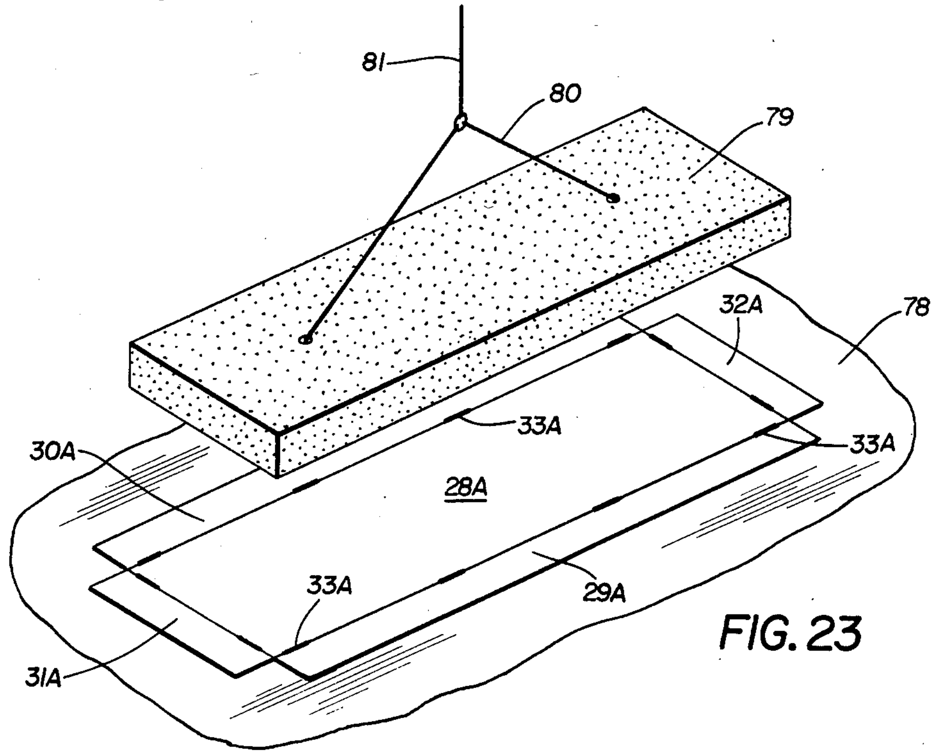
FIG. 23

BURGLARY RESISTANT STEEL FIBER REINFORCED CONCRETE CONSTRUCTION FOR VAULT WALLS AND DOORS AND MANUFACTURE THEREOF

CROSS-REFERENCE TO RELATED COMPANION APPLICATION

The improved steel fiber reinforced concrete composition of the invention satisfies certain Underwriters Laboratory Standards (No. 608) relating to burglary resistant modular vault wall and door panels, and is a companion composition to that set forth in applicants' application filed May 25, 1983, Ser. No. 497,824, which satisfies different Underwriters Laboratory Standards (No. 687) relating to burglary resistant safes, etc.

BACKGROUND OF THE INVENTION

1. Field of the Invention

The invention relates to a light, narrow, lightweight cast vault wall panel construction which will withstand burglarious attack and which may be used for either door slabs or modular panels to fabricate vaults to protect valuables.

Also, the invention relates to modular panels that may be assembled to form a vault during construction of a building or in existing buildings. Such panels also may be used to expand a vault size at any time. Such vault wall panels may be removed and reassembled at another site.

In addition, the new reinforced concrete modular panels enable vault walls to be provided thinner than traditional reinforced concrete vault walls while offering acceptable burglarious protection.

Further, the invention relates to a superplasticized steel fiber reinforced concrete product and manufacture, intended for use in safes, vault doors, vault walls, etc. which reinforced concrete product is superior to conventional reinforced Portland cement concrete for such applications.

Finally, the invention relates to a reinforced concrete composition containing extraordinarily high amounts or dosage rates of superplasticizing, water-reducing admixtures along with extraordinarily high steel fiber contents to produce a concrete product having outstanding strength and impact resistance as compared to conventional Portland cement concrete ordinarily composed of Portland cement, fine aggregate, coarse aggregate and water.

2. Description of the Prior Art

The amount of water used in conventional concrete has a major effect on the resulting engineering properties of the concrete. As the water content increases, most of the engineering properties of the concrete are adversely affected. Additionally, even when the water content falls within an acceptable range, the flexure strength of the concrete and, hence, its resistance to cracking is relatively low. Such difficulties are avoided by the substantially reduced water content of the composition of the invention while providing the desired fluidity for casting from conventional mixers.

Conventional prior art vault construction usually has involved thick walled vaults formed by conventional Portland cement concrete cast in place. The improved panel construction of the invention eliminates cast-in-place problems and the improved modular fiber reinforced concrete panel construction permits reduced wall thickness while satisfying burglary resistant requirements.

Prior art proposals for cast metal fiber reinforced concrete vault walls have used metal fiber reinforcement concepts of the prior art in seeking to improve cast vault wall protective characteristics. Examples of such prior art include U.S. Pat. Nos. 4,377,977, 3,429,094, 4,388,874 and 4,389,948.

Essentially, the composition of the reinforced concrete in such prior art proposals involves simple mixtures of steel fibers, hydraulic cement, sand, and water. Specifically, the cement component in U.S. Pat. No. 4,377,977 composition is expansive cement, asserted in combination with the steel fibers to create a "self-stressing" material.

However, the difficulties remain that are encountered with the typical strength levels of conventional Portland cement concrete having a water content sufficient to enable mixing in a conventional manner in conventional mixers and to provide fluidity for pouring in molds.

Thus a need has existed in the field of protective vault construction for a castable concrete wall and door panel construction with improved engineering properties providing required burglarious attack resistance in thinner walls than those required for equivalent attack resistance formed of conventional cast reinforced concrete, which panels may be used to construct removable, expandable, dismantlable and reassemblable vault structures in new or existing buildings.

SUMMARY OF THE INVENTION

Objectives of the invention include providing a new attack resistant steel fiber reinforced castable concrete wall and door modular panel construction which is relatively thin and light in weight and has outstanding engineering properties resistant to burglarious attack measures superior to those characterizing conventional reinforced Portland cement cast-in-place concrete vault walls, or to those characterizing prior art steel fiber reinforced cast concrete vault walls; providing such new modular panel construction having a unique concrete formulation composition of constituents comprising, Portland cement, fly ash, fine aggregrate, gravel or crushed stone, water, high range superplasticizing, water-reducing admixture, and steel fibers, which concrete has outstanding strength and impact resistance relative to conventional Portland cement concrete; providing such new modular panel construction in which substantial reduction in water content of the formulation, relative to conventional Portland cement concrete, is achieved by combining said admixture in the formulation; providing such new modular panel construction having such new concrete formulation, which resists the burglarious attack, as outlined in Underwriters Laboratory Standard No. 608, in wall thicknesses of 8" for one hour and of 11" for two hours; providing such new modular panel construction in which multiple such panel units may be assembled or disassembled to form or dismantle the side walls, top and bottom walls and door of a vault installation in an existing or new building, and in which the vault size may be changed by the addition of or reduction of the number of panels required, and in which a vault composed of such assembled panels may be dismantled and reassembled at another site; providing such modular panel construction in which such panels are molded flatwise in a reusable five-sided mold composed of a mold bottom wall and openable mold side and end walls from which a cast modular panel is removed after casting and curing and installed as such in vault installation free of any shells such as sheet metal shells in which prior art metal fiber reinforced concrete vault walls are cast and is retained in vault construction; providing a new procedure for mixing such new formulation of such new modular panel concrete in conventional concrete mixers for pouring the mix composition in molds such as described, to cast such panels in such molds for curing and removal; providing such new modular panel construction in which such panels have complementary overlap formations to form overlapped joints between adjacent panels when multiple such panels are assembled to install a vault, and in which such panels have vault-interior connector means spanning joints between adjacent panels to lock said panels together, whereby such multiple panels are integrated in one secure structure; providing such new modular panel construction in which at least one of the panels when multiple such panels are integrated to form a secure vault structure is provided with manhole means having a manhole plug vault-interior locked in manhole closing position, whereby said plug when the vault encounters a vault lock-out status may be destroyed, and access gained to the interior of the vault to correct the lock-out status and to install and lock a new plug for said manhole; and providing such new modular panel construction for building integrated multiple panel vaults and vault doors and such new concrete formulations therefor and new methods of mixing such formulation which may be carried out using conventional concrete mixers, in which such panels and methods satisfy the indicated objectives and solve long-standing problems existing in the field of secure vault construction.

These and other objectives and advantages may be obtained by the burglar resistant vault wall panel construction which may be stated in general terms as a burglar resistant modular panel construction for multiple panel assembly of an integrated secure vault having a castable metal fiber reinforced concrete composition containing the following constituents in proportions in the following approximate ranges:

| Concrete Constituents | Lbs. | Weight % |
|---|---|---|
| Portland Cement - One of the Class Consisting of Type I and Type III Portland Cement | 830.5 to 847.5 | 18.88 to 19.81 |
| Fly Ash - One of the Class Consisting of Class F and Class C Fly Ash | 60.4 to 61.6 | 1.37 to 1.45 |
| Fine Aggregate (SSD) | 1700 to 1769 | 39.12 to 40.86 |
| Gravel - One of the Classes Consisting of No. 8 Gravel and Crushed Stone (SSD) | 1098 to 1142 | 25.12 to 26.53 |
| Water | 212 to 220 | 4.81 to 5.15 |
| Melamine Superplasticizing Water-Reducing Admixture | 42.375 to 44.125 | 0.96 to 1.04 |
| Steel Fibers - (0.016 in. diameter × $\frac{3}{4}$ in. long ± $\frac{1}{4}$ in.) | 317.5 to 330.5 | 7.21 to 7.73 |

These objectives and advantages also may be obtained by the method of mixing and casting a metal fiber reinforced concrete composition containing constituents in proportions in pounds per cubic yard in the approximate ranges, as aforesaid, in a rotatable tumbling concrete mixer to form a castable mixture which may be poured from the mixer into an open top of a generally flat five-sided mold to form a modular panel for multiple panel assembly of an integrated secure vault including the steps of introducing said Cement, Fly Ash, Fine Aggregate, Gravel and Water constituents in the stated proportions into such mixer; then rotating said mixer to tumble and agitate said constituents in the mixer until a mass of crumbly, damp, powder and aggregrate is formed; then adding said Admixture and continuing mixer rotation until the constituents reach a state of high fluidity which usually occurs in about 1 to 5 minutes after the Admixture has been added; then adding the Steel Fiber constituent while continuing rotation and agitation of the mixed constituents until the mixture reaches a fully integrated state; and then pouring the integrated mixture into said mold while externally vibrating the mold to enable the integrated composition to consolidate in the mold.

BRIEF DESCRIPTION OF THE DRAWINGS

Preferred embodiments of the facets of the invention—illustrative of the best modes in which applicants have contemplated applying the principles—are set forth in the following description and shown in the drawings and are particularly and distinctly pointed out and set forth in the appended product and method claims.

FIGS. 21, 22 and 23 diagrammatically illustrate various steps in the procedure for casting a panel in a mold cavity and for removing the cast panel from the mold.

Similar numerals refer to similar parts throughout the drawings.

Figure 1:
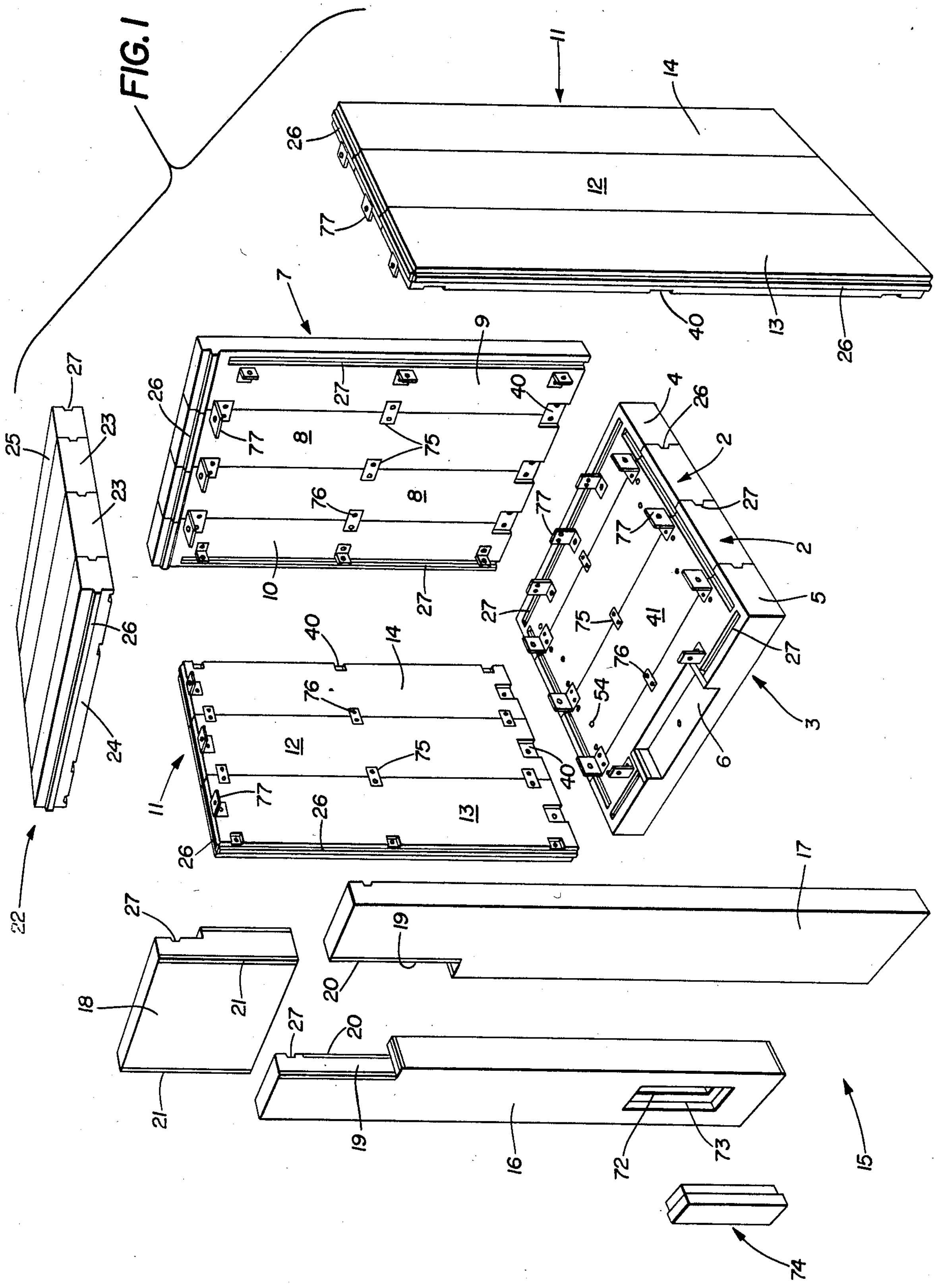
FIG. 1 is an exploded diagrammatic perspective view of a series of improved modular panels made of the castable metal fiber reinforced concrete composition of the invention illustrating panel assemblies of bottom, side, back, front or door, and top vault walls before being connected together to form a burglar-resistant integrated security vault.

DESCRIPTION OF PREFERRED EMBODIMENT OF FORMULATION, PANEL PRODUCT, INTEGRATED VAULT AND METHODS

Initially, the unique formulation and unusual characteristics of the castable metal fiber reinforced concrete composition which comprises the fundamental aspect of the invention is described below. Then the procedure is described for mixing such composition in a typical concrete mixer to produce a castable concrete, that is one sufficiently fluid to be poured and cast in a top-opening mold cavity from which it is removed by opening the mold side and end walls.

A series of such cast metal fiber reinforced concrete modular panel product units are made using molds having various but generally similar mold cavity shapes. The procedure for assembling multiple such panels to form the side, back, front, bottom and top walls of an integrated vault which will withstand burglarious attack then is described.

Such vaults may be constructed as described in either new or old buildings, may be increased in size, or may be dismantled and reassembled at another location.

An example of the formulation for a batch of the metal fiber reinforced burglar resistant concrete composition which may be cast in a five-sided top-opening mold cavity to form a modular vault wall panel is set forth in the following:

| Concrete Constituents | Lbs. | Weight % |
|---|---|---|
| Portland Cement - One of the Class Consisting of Type I and Type III Portland Cement | 830.5 to 847.5 | 18.88 to 19.81 |
| Fly Ash - One of the Class Consisting of Class F and Class C Fly Ash | 60.4 to 61.6 | 1.37 to 1.45 |
| Fine Aggregate (SSD) | 1700 to 1769 | 39.12 to 40.86 |
| Gravel - One of the Classes Consisting of No. 8 Gravel and Crushed Stone (SSD) | 1098 to 1142 | 25.12 to 26.53 |
| Water | 212 to 220 | 4.81 to 5.15 |
| Melamine Superplasticizing Water-Reducing Admixture | 42.375 to 44.125 | 0.96 to 1.04 |
| Steel Fibers - (0.016 in. diameter × $\frac{3}{4}$ in. long ± $\frac{1}{4}$ in.) | 317.5 to 330.5 | 7.21 to 7.73 |

The specifications for the Type I and Type III Portland Cement constituent of the composition set forth in the above Table are those identified as C-150 American Society For Testing Materials' (ASTM) standard specifications for Portland Cement. The quantity of Portland Cement in a batch of the formulation for the new composition of the invention is relatively high and may have a value of 839 lbs±8.5 lbs or 18.88 to 19.81 weight % of the formulation which is identified in the Table by the range indicated.

The Fly Ash constituent of the composition set forth in the Table as being either Class F or Class C Fly Ash is material defined in the ASTM specifications C618-80. The Fly Ash quantity in a batch of the formulation is nominally 61 lbs.±0.6 lbs or 1.37 to 1.45 weight % of the formulation. The Fly Ash is present in the composition to react with the calcium hydroxide phase of the hydrated cement to form additional cementitious binder which improves the overall strength and impact resistance of the concrete. Further, the Fly Ash may reduce somewhat the amount of Portland cement in the formulation.

The fine aggregate phase of the concrete in the Table is a concrete sand defined under the ASTM specifications C33-81. The nominal amount of fine aggregation in a batch of the formulation is 1734 lbs−34 lbs to +35 lbs SSD (Surface Saturated Dry) or 39.12 to 40.86 weight % of the formulation.

The gravel constituent of the composition in the Table is indicated as being either No. 8 Gravel or Crushed Stone, such as limestone, in the nominal amount in a batch of the formulation of 1120 lbs±22 lbs or 25.12 to 26.53 weight % of the formulation. Such gravel also is that specified as C33-81 in ASTM standards. Further, the formulation in the Table is based on the Gradation and specific gravity of sand and gravel used in northern Ohio. If concretes are made using this formulation in other locations it may require somewhat different amounts of sand, gravel and water in order to provide the concrete yield and achieve the level of workability characteristic of the formulation set forth in the Table.

Improvements in the performance of the concrete may be realized if harder and denser coarse aggregates are used such as fused $Al_2O_3$.

The water content of the composition is unusual in that the water-cement ratio is extremely low, less than 0.30. The nominal water content in a batch of the formulation is 216 lbs±4 lbs or 4.81 to 5.15 weight % of the formulation. Even with this extremely low water-cement ratio, the concrete mixed in accordance with the formulation set forth in the Table is self-leveling, a unique characteristic resulting from interrelationships between the constituents of the compositions explained below.

The next constituent of the compositions set forth in the Table is the Melamine superplasticizing water-reducing admixture in the nominal amount in a batch of the formulation is 43.25 lbs±0.875 lbs or 0.96 to 1.04 weight % of the formulation. This high range water-reducing admixture is one as specified in ASTM Designation C494-81, Type F or Type G.

The steel fiber constituent of the composition set forth in the Table is a nominal amount in a batch of the formulation of 324 lbs±6.5 lbs or 7.21 to 7.73 weight % of the formulation. The steel fiber constituent may be 0.016 in. diameter×¾ in. long±¼ in. or other sources and/or types of steel fibers with an aspect ratio between 40 and 100 can be used. The amount of other fibers will be such as to provide the same Flexural Toughness Index in concrete as 324 lb/yd$^3$ of 0.016 in. diameter×¾ in. long steel fiber.

A reinforced concrete cast in accordance with the formulation of the Table is quite different from conventional steel fiber reinforced concrete (SFRC) in that it has an extremely high dosage rate of superplasticizing admixture and an extremely high steel fiber content. The use of the high superplasticizing admixture dosage provides a concrete having unique rheological properties.

The uniqueness is related to the fact that the concrete is self-leveling as mixed even though the water-cement ratio is extremely low (less than 0.30). This rheological feature, combined with the high cement/fly ash content and small coarse aggregate size (⅜ in. maximum size), makes it possible to incorporate higher than normal amounts of steel fiber in the concrete while retaining satisfactory handling and placing characteristics.

The interrelationship between the constituents of the new metal fiber reinforced concrete composition having the relative proportions set forth in the Table solved problems encountered in the ability to mix the composition in conventional concrete mixers and to pour the same into an open mold. The solution of the problem enabled consolidation of the poured concrete to be achieved, and a cast reinforced concrete panel having the enhanced burglar resistant properties described to be produced. These problems were overcome by the unique features of a discovered mixing procedure described below.

Conventional concrete very quickly assumes a fluid state once all of the ingredients are in a conventional mixer regardless of the mixing sequence, that is, the time at which each ingredient is added. For example, in large central mix operations, 8 to 10 cubic yards of concrete can be effectively mixed in less than one minute.

Such conditions do not prevail when attempting to mix the composition of the invention stated in the Table. Initially the normal Portland Cement, fly ash, fine aggregate, gravel and water concrete constituents of the new composition are added in a conventional mixer which serves as container means as well as mixing means for the constituents. When operation of the mixer is started, the concrete is not in a fluid state. In fact, even though mixing is carried out for three, four or even five minutes, the concrete still is not in a fluid state. Rather, it develops to a mass of crumbly, damp, powder and aggregates.

At this point in attempting to mix said concrete components of the formulations of the new composition in the amounts indicated in the Table, one normally skilled in concrete technology would be inclined to scrap the mixture or to add additional water in an effort to gain a desired level of fluidity.

We have found, however, that if mixing is continued for an extraordinarily long period of time, and then adding to the mixture the superplasticizing admixture constituent, the mixture then reaches a fluid state normally within about 1 to 5 minutes after the admixture is added and continues in that state. This enables the metal fiber to be added to the mixer while the mixer continues its mixing operation. The complete formulation eventually reaches a fully integrated state and the mixture continues to be fluid. This state of fluidity is sufficient to permit pouring of the mixture into a mold cavity while the mold is externally vibrated.

The poured mixture may initially assume a somewhat moundlike shape but so long as the mold is externally vibrated, the mixture settles in, and consolidates in the mold cavity. The mold during vibration is in a generally horizontally extending or flatwise position.

As described below, a mold used for casting a metal fiber reinforced concrete modular panel with the castable composition of the invention has a generally rectangularly shaped cavity formed by a flat mold bottom wall and mold cavity forming side and end walls which are releasable to permit lifting of a cast panel from the mold after the cast panel has cured in the mold.

Modular panels thus cast with steel fiber reinforced concrete having the composition set forth in the Table has strength and impact resistance much higher than that previously characterizing prior or conventional steel fiber reinforced concretes (SFRC). The superior performance and outstanding results characterizing the new concrete are the combined contributions of the low water-cement ratio, the high cement content, the fluidity of the formulation, the relatively small coarse aggregate size, (⅜ inch), and the much higher than normal amount of steel fibers.

Figures 5, 6, 7, 8:
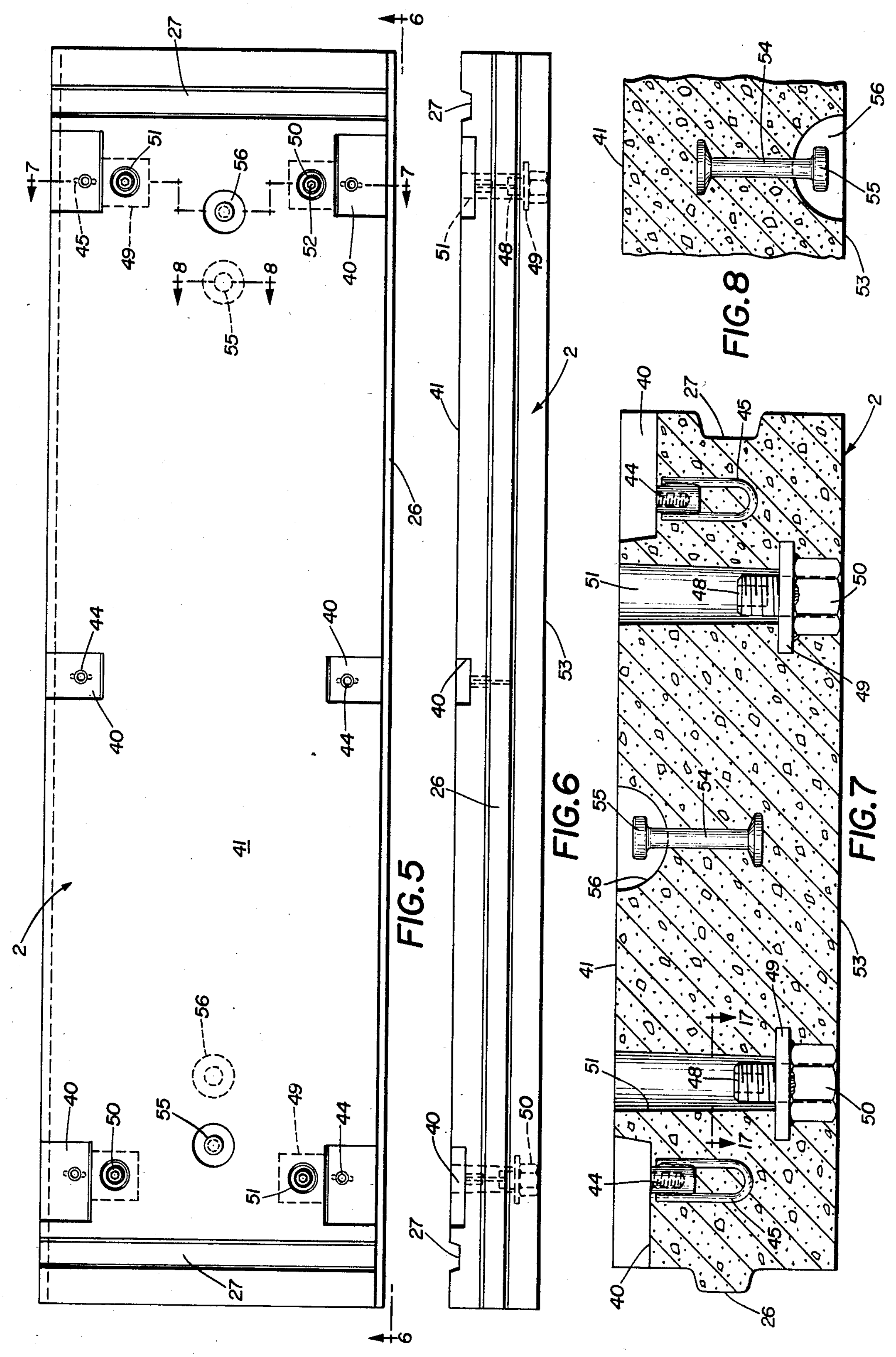
FIG. 5 is a plan view of a vault bottom wall panel looking toward the panel surface presented inside of a vault when the panel is assembled to form a vault bottom wall as shown in FIG. 1.
FIG. 6 is a view looking in the direction of the arrows 6—6, FIG. 5, toward the side edge of the vault bottom wall panel shown in FIG. 5.
FIG. 7 is an enlarged sectional view taken on the line 7—7, FIG. 5.
FIG. 8 is a fragmentary sectional view similar to a portion of FIG. 7 looking in the direction of the arrows 8—8, FIG. 5.
Figures 9, 10, 11, 12, 17:
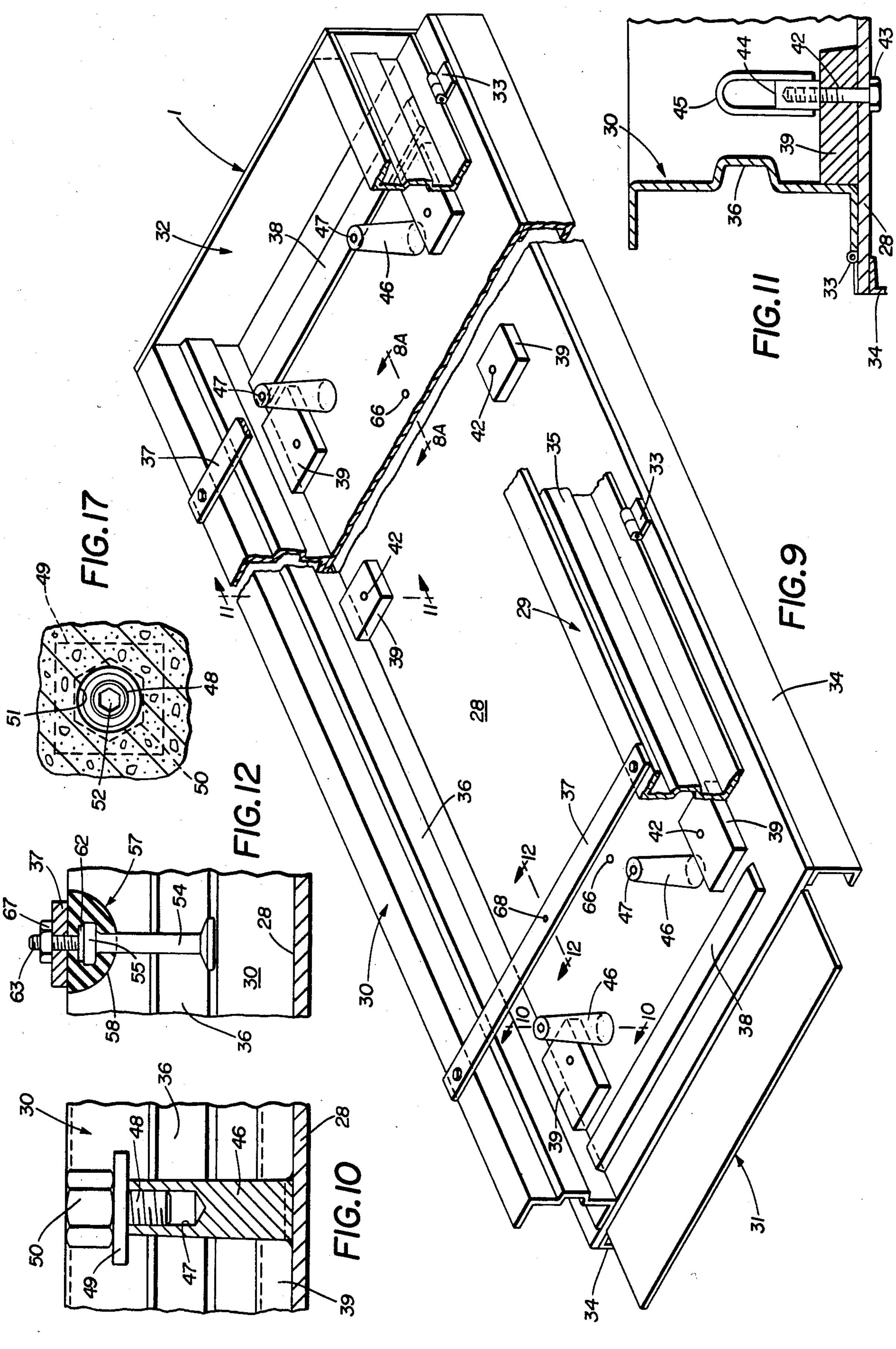
FIG. 9 is a perspective view, with some parts broken away and in section, and with other parts illustrated somewhat diagrammatically, showing a mold in the cavity of which the bottom wall panel of FIG. 5 may be cast.
FIG. 10 is an enlarged fragmentary sectional view taken at the location of the arrows 10—10, FIG. 9, illustrating a mold core shown in FIG. 9 supporting a leveling bolt in the mold cavity that is cast in the bottom wall panel for panel leveling during vault construction.
FIG. 11 is an enlarged fragmentary sectional view looking in the direction of the arrows 11—11, FIG. 9, illustrating devices located in the mold cavity and cast in the panel as shown in FIG. 7 for connecting adjacent panels during vault construction.
FIG. 12 is an enlarged fragmentary sectional view taken at the location of the line 12—12, FIG. 9, illustrating panel lifting hook engagement devices held in the mold cavity during casting; and forming part of the cast panel as shown in FIG. 7.
FIG. 17 is an enlarged fragmentary sectional view taken on the line 17—17, FIG. 7 showing the hex recess in the leveling screw cast in the panel which was supported in the mold cavity during casting as shown in FIG. 10.

A typical mold generally indicated at 1 in which a modular bottom wall panel is cast or molded is shown in FIG. 9. A typical modular bottom wall panel generally indicated at 2 that may be cast in the mold 1 is indicated in FIGS. 5, 6 and 7. Several modular bottom wall panels 2 are shown in FIG. 1 in the course of assembling the bottom wall generally indicated at 3 of a vault being constructed. The vault bottom wall 3 also has bottom wall finishing panels 4 and 5 generally similar to panels 2. The panel 4 is adapted to finish the back end of the vault bottom wall 3 and to be joined by the vault back wall generally indicated at 7.

The front of the vault bottom wall 3 is finished by panel 5 which contains a recess 6 for accommodating the threshold for the vault door which is not shown. The assembly of the vault bottom wall 3 using multiple modular panels 2, 4 and 5 is described below.

Figure 4:
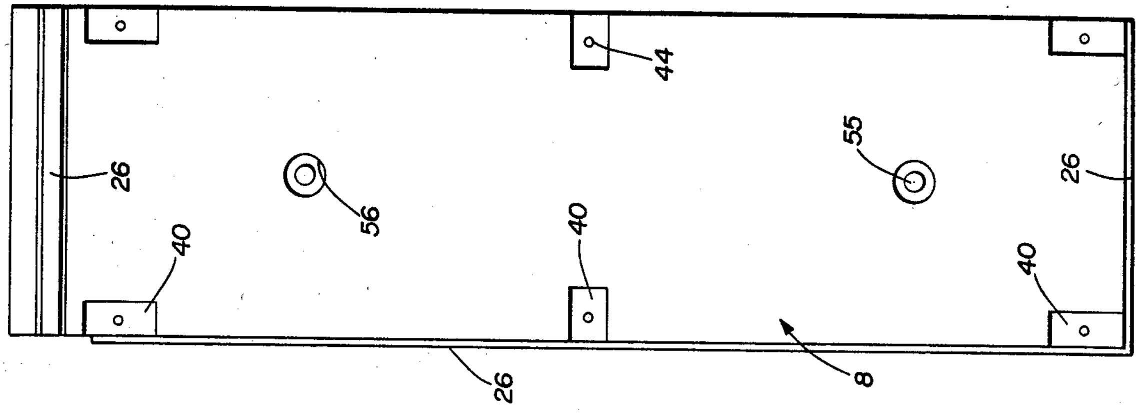
FIGS. 2, 3 and 4 are similar views looking toward the panel surface presented inside of a vault when the panels are assembled to form vault walls, respectively, of a front, a side and a back wall panel.

A modular back wall panel, generally indicated at 8, and is shown in FIG. 4, several panels 8 are assembled to form the vault back wall 7 as shown in FIG. 1, accompanied by back wall finishing panels 9 and 10 which have the same length as the panels 8 but are modified with respect to the panels 8 to adapt them to be joined to similar vault side walls generally indicated at 11.

Figure 3:
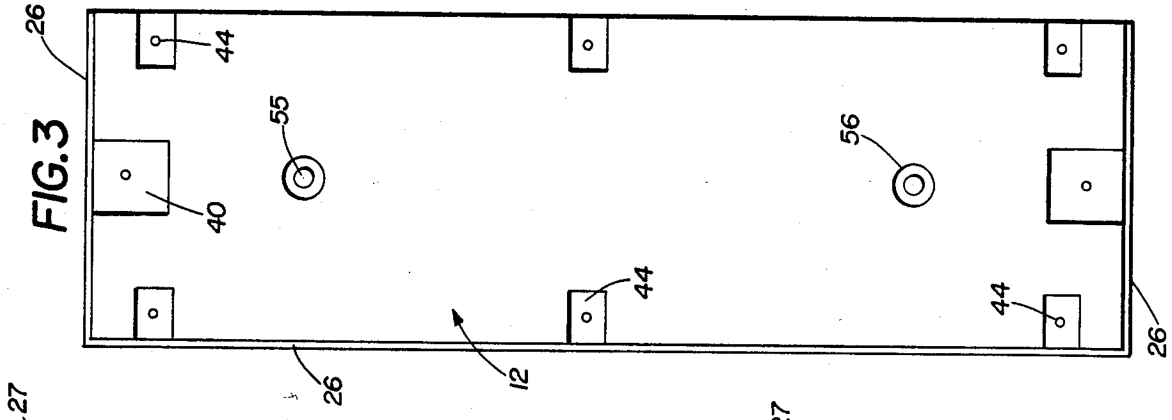

A typical side wall panel is generally indicated in FIG. 3 at 12, and such panels 12 are used in the assembly of vault side walls 11 along with modified side wall finishing panels 13 and 14. The assembled side wall panels 12, 13 and 14 adapt the vault side wall assembly 11 to be joined with the vault bottom wall 3 and the vault back wall 7 as well as other vault wall assemblies.

The panels 12, 13 and 14 are shorter in length than the back wall panels 8, 9 and 10 as is shown comparatively in FIGS. 3 and 4 for a purpose to be described.

Figure 2:
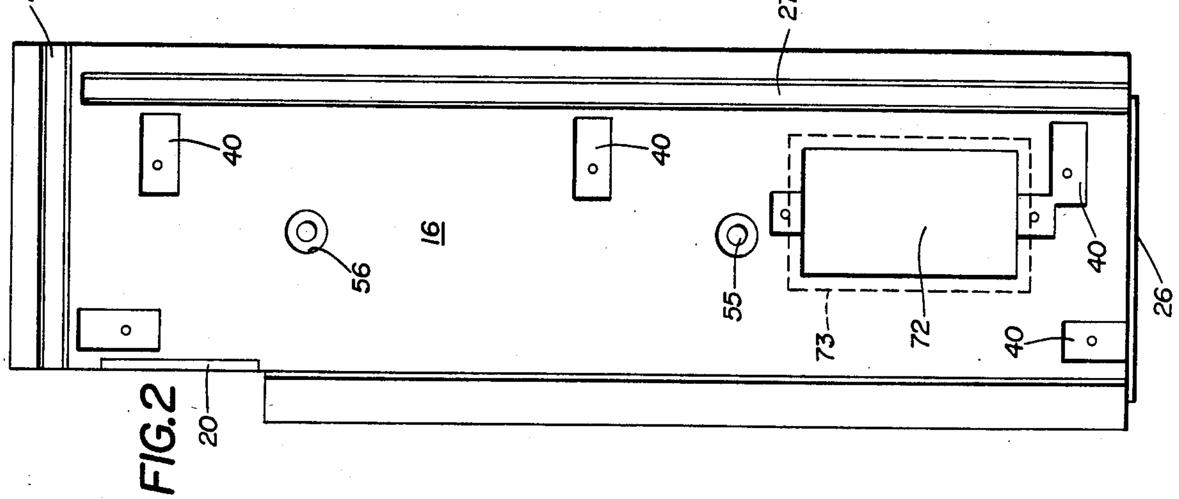

The vault front or door wall, generally indicated at 15 (FIG. 1), is formed of modular panels 16, 17 and 18 shown unassembled in FIG. 1. Panel 16 also is shown in FIG. 2 and panel 17 is generally similar. Panels 16 and 17 are joined at the top with the vault door opening header panel 18 received in the shouldered recesses 19 at the upper ends of panels 16 and 17.

The shouldered recesses 19 have metal angle members 20 cast integrally with the panels. Similarly the header panel 18 has corner metal angles 21 cast integrally with the panel. When the panel 18 is assembled with the panels 16 and 17 it is received in the shouldered recesses 19. Then metal angles 20 and 21 are welded together to integrate the vault door wall 15. The door wall panels 16 and 17 have the same length as the back wall panels 8, as shown in comparing the lengths of panels 8 and 16, respectively, in FIGS. 4 and 2.

A top vault wall is generally indicated at 22 in FIG. 1 and is formed of an assembly of top panels 23 and top finishing panels 24 and 25, as shown.

Complementary overlapping or interfitting formations are provided on the various panels at locations on their inner surfaces, and on edge and end surfaces which are adapted to form interengaged joints between adjacent panel surfaces where assembled.

Such interengageable joint formations may involve tongue and groove formations 26 and 27. For example, grooves 27 surround the vault interior surface of the vault bottom wall 3 substantially around the perimeter thereof.

These grooves 27 receive tongue formations 26 at the bottom ends of the panels which form the vault back, side and door walls 7, 11 and 15 when the same are assembled to form a vault. Similarly, tongues 26 (FIG. 1) on the edges of the vault side wall assemblies 11 are received in grooves 27 formed on the inner surface of the door wall panels 16 and 17 of vault door 15 (FIG. 2). Similar tongues on the back edges of vault side walls 11 are received in grooves 27 in the vault inner surface of vault back wall assembly 7 (FIG. 1).

As the vault walls are being assembled, the top vault wall 22 has a tongue 26 received in groove 27 formed in header panel 18 and has a groove 27 which receives the tongue 26 extending across the top of the vault back wall 7.

The mold 1 in which a modular bottom wall panel 2 is cast is somewhat diagrammatically illustrated in FIG. 9. Mold 1 includes a bottom mold wall 28, mold side walls generally indicated at 29 and 30 and mold end walls generally indicated at 31 and 32. The side walls 29 and 30 have hinge connection 33 at intervals with the bottom wall 28. End walls 31 and 32 similarly are hinged to bottom wall 28 so that the mold side and end walls may be outwardly opened after a panel has been cast in the cavity formed by the said mold bottom, side and end walls.

The contour of the inner surface of each side and end wall 29 through 32 is formed to provide the proper shape to the ends and edges of any modular panel being cast, such as the various panels illustrated in FIG. 1. An individual mold is provided for each particular panel shape required to be cast. Such various molds may be provided separately or by changing the side and end mold walls that may be required and which are hingedly mounted on a main mold bottom wall 28.

The mold bottom wall 28, for various purposes, preferably is spaced above the surface on which the mold is supported by channel shaped stringer supports 34. This permits devices, where necessary, to project below the underside of the mold bottom wall 28. Also vibrating equipment may be located or connected to the bottom mold wall 28 beneath the mold for vibrating the mold during casting.

As shown in FIGS. 6 to 9, the mold side wall 29 has a groove recess 35 therein to form the tongue 26 on the cast panel 2. The mold side wall 30 similarly has a tongue formation 36 to form a groove 27 in the cast panel 2. Since the ends of the vault bottom wall assembly panels 2, 4 and 5 are flat (FIG. 1), the hinged mold end walls 31 and 32 also are flat.

When mold walls 29 and 30 are in the cavity forming positions shown, strap members 37 are connected at their ends to the mold walls 29 and 30 not only to hold the walls in cavity forming and molding position but also to support certain mold components to be described.

Tongue strips 38 are mounted on the bottom wall 28 spaced from the ends of the bottom wall and the mold end walls 31 and 32 to form the grooves 27 adjacent the ends of the cast panel 2 illustrated in FIGS. 5 and 6.

Blocks 39 are located at spaced intervals along the inside surfaces of the mold side walls 29 and 30. The blocks form recesses 40 in the cast panel surface 41 which surface 41 is formed by the bottom wall 28 of the mold 1 and becomes the inner vault surface of the panel 2 when erected in forming a vault.

An opening 42 is formed in each block 39 and the mold bottom wall portion beneath each block through which a bolt 43 extends upward from the underside of the mold bottom wall 28 (FIG. 11).

The bolt 43 is threaded into and mounts on the block 39 a nut member 44 to which a loop 45 is welded. The nut and loop project upward from the block 39 into the mold cavity as shown in FIG. 11. The nut and loop thus becomes embedded in and integrated within the panel 2 cast in the mold 1 as shown in FIG. 7. Before the panel 2 is removed from the mold, the bolts extending through the blocks 39 are removed. Threaded connectors (nuts 44) thus are located beneath the recess 40 for a purpose to be described.

Conically tapered core members 46 preferably are welded to and project upward from the mold bottom wall 28 adjacent each end corner of the mold cavity (FIGS. 9 and 10). Each member 46 has a central bore or opening 47 at its upper end. A leveling screw 48 threaded into a preferably square washer 49 and a nut 50 welded to the washer 49 is supported on conical core 46 by inserting the leveling screw 48 into the core opening 47. The outer end of the nut 50 is flush with a plane passing through the top flanges of the mold side walls 29 and 30 as shown in FIG. 10.

This leveling screw assembly thus is cast in and becomes integrated in the panel 2 when cast, as shown in FIG. 7. The removal of the cast panel 2 from the mold 1 and cores 46 leaves openings 51 extending to the panel surface 41 and communicating with the inner ends of the leveling screws 48.

Referring to FIG. 17, the hexagonal socket 52 formed in the inner end of leveling screw 48 thus may be engaged by a socket wrench to project the leveling screw from the lower or undersurface 53 of panel 2 in order to level the panel when installing a multi-panel vault bottom wall (FIG. 7).

The cast panel 2 is provided with lifting devices that are cast and integrated in the panel. Such lifting device 54 comprises a dumbbell-shaped metal spool having a head 55 located in a semispherical recess 56. This dumbbell head 55 thus is accessible for engagement by a forked lifting hook manipulating from hoist equipment.

Preferably several of such lifting devices 54 are integrated in the cast panel accessible at each of the panel surfaces 41 and 53 near the panel ends (FIGS. 5, 7 and 8).

The dumbbell lifting device 54 must be supported in the mold cavity while the panel is being cast therein with a support device that may be removed therefrom after the panel is cast to render lifting device head 55 accessible at the panel surfaces at each of the lifting device 54 locations.

Figure 18:
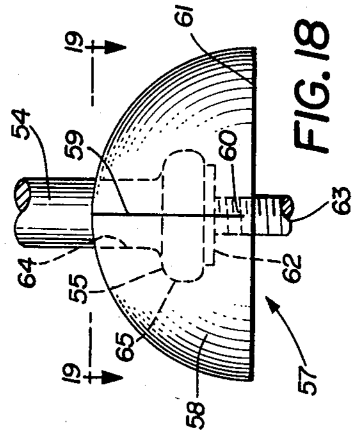
FIG. 18 is an enlarged view illustrating a semi-spherical sponge rubber ball support means shown in FIGS. 8A and 13 detached from the mold but supporting the lifting hook engagement device to be cast in a panel.
Figure 19:
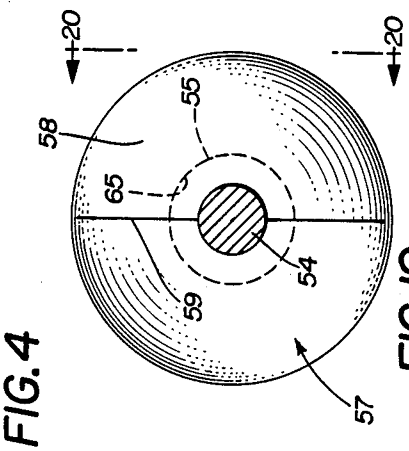
FIG. 19 is a plan sectional view looking in the direction of the arrows 19—19, FIG. 18.
Figure 20:
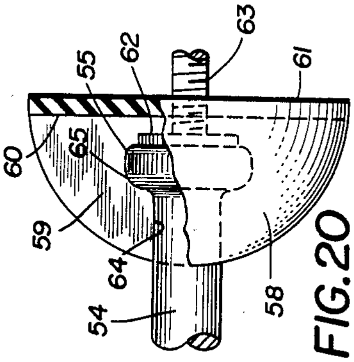
FIG. 20 is a side view with parts broken away looking in the direction of the arrows 20—20, FIG. 19.

The support device is generally indicated at 57 in FIGS. 18 to 20 and comprises a semispherical sponge rubber body 58 having a diametrical slit 59 therein extending from its rounded end downward to a lower edge or valley location 60 spaced from the bottom surface 61 of the body 58. A metal disc 62 is molded in the rubber body adjacent the slit valley 60. A threaded shank 63 extends from disc 62 beyond the bottom surface 61 of the rubber body 58.

Figure 8A:
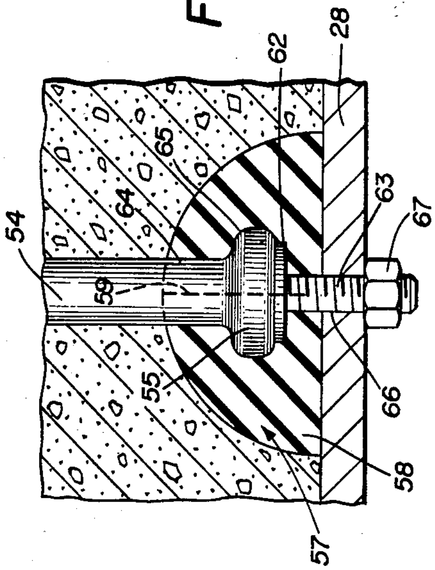
FIG. 8A is an enlarged fragmentary sectional view illustrating the manner in which mold components for supporting lifting devices are mounted on the bottom mold plate of the mold shown in FIG. 9 at the location identified by the section line 8A—8A.

A hole 64 is formed on body 58 extending downward from the rounded surface of the body axially aligned with the shank 63, and the hole is enlarged at 65 at its inner end adjacent the metal disc 62 (FIGS. 8A and 18).

The rubber body 58 may be spread open at the slit 59 and the head 55 of lifting device, spool or dumbbell 54 inserted through the hole 64 into the enlargement 65 thereof and supported on the metal disc 62, as best shown in FIGS. 8A and 18.

These support devices 57 and lifting devices 54 assemblies may be mounted on the mold bottom wall 28 by extending the shanks 63 through bottom wall openings 66 and holding the shanks with nuts 67 at the underside of the bottom wall 28 as shown in FIG. 8A. In this manner lifting devices are located and held in the mold cavity while a panel is being cast therein.

Such lifting devices ultimately are accessible at the panel surface 41 of a cast panel as shown in FIG. 7.

It is also desired to locate lifting devices in the cast panel at locations on the undersurface 53 of the panel as cast as indicated in FIG. 8 and in dotted lines at section line 8—8, FIG. 5. In order to accomplish such lifting device location in the cast panel, assemblies thereof with support devices 57 such as shown in FIG. 18 may be bolted to the strap members 37 through openings 68 located at approximately their midpoints as shown in FIGS. 9 and 12.

Figure 13:
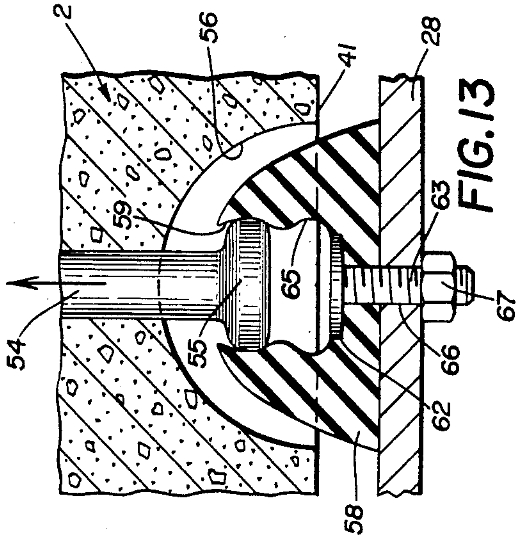
FIG. 13 is an enlarged view similar to FIG. 8A illustrating the FIG. 5 panel being raised from the mold bottom wall to separate the lifting device cast in the panel from its mold bottom wall support.

After a panel has been cast, the support devices 58 may be released from the mold bottom wall 28 by removing the nut 67 (FIG. 13), or from the strap 37 by removing the nut 67. Then when the projecting shanks 63 are accessible, the shanks may be pulled and the rubber bodies will distort to release their holds on the heads 55 of the lifting devices 54 as somewhat diagrammatically illustrated in FIG. 13.

Figure 14:
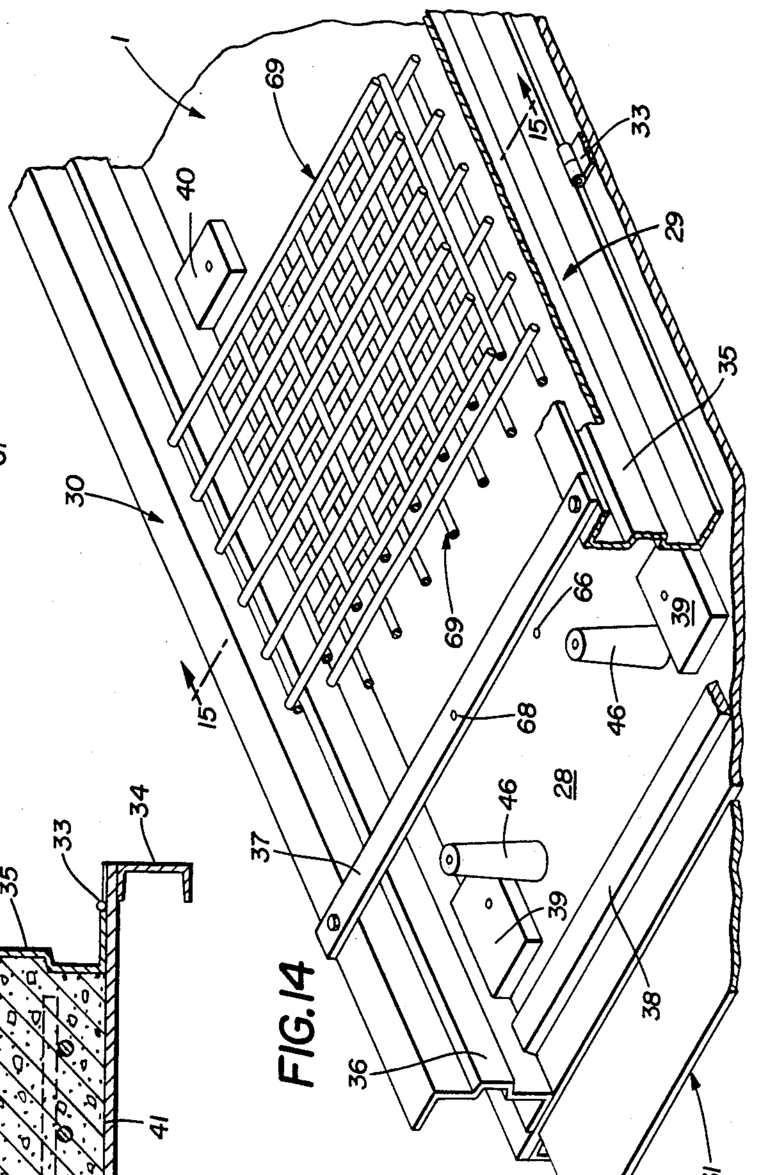
FIG. 14 is a fragmentary diagrammatic view similar to a portion of FIG. 9 but illustrating two re-bar mats supported in the mold prior to casting a panel in the mold.
Figure 15:
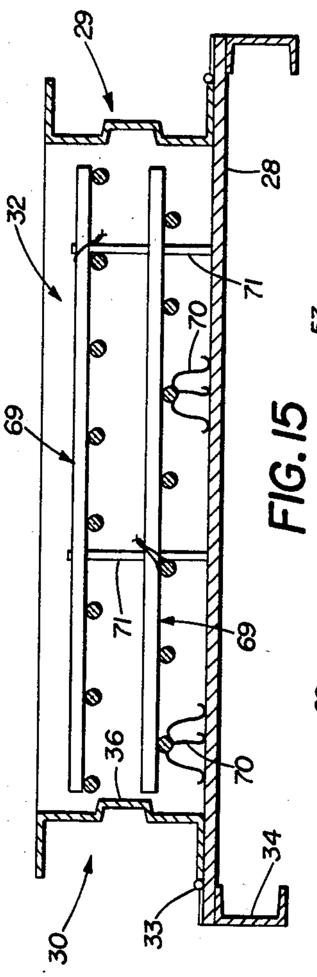
FIG. 15 is a somewhat diagrammatic sectional view looking in the direction of the arrows 15—15, FIG. 14, showing the location of the two re-bar mats in the mold cavity prior to casting.
Figure 16:
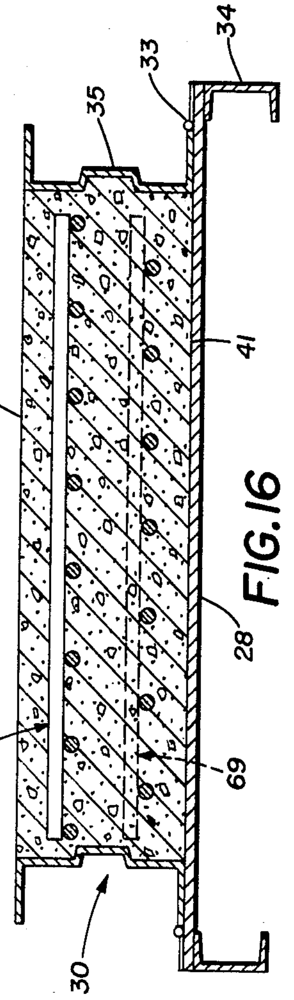
FIG. 16 is a sectional view taken at the location of the sectional view of FIG. 15 but illustrating the panel in section with re-bar mats therein after casting in the mold shown in FIGS. 9 and 14.

The various cast panels referred to above also have reinforcing bar mats (re-bars) located therein as generally indicated at 69 in FIGS. 14, 15 and 16. FIG. 14 diagrammatically shows a portion of FIG. 9 with two re-bar mats 69 therein spaced one above another and located intermediate the surfaces 53 and 41 of the cast panel as shown in FIG. 16.

Preferably two re-bar mats 69 are cast in the concrete where the panel is, say, 8" thick, while three re-bar mats 69 would be cast in a panel 11" or more thick.

The lower re-bar mat 69, as shown in FIG. 15, is supported by a plurality of typical three-legged wire support devices 70. Upright rods 71 located at spaced intervals in the mold cavity and supported on the mold bottom wall 28 are wired as shown to the mats 69 to hold them in proper position in the mold cavity.

The bars in the re-bar mats 69 normally are spaced on 4" centers and are ⅝" diameter bars, as is known in the art. These re-bar mats resist attack by Diamond Core Drills which can easily attack the cement component of the concrete if re-bars are not present.

Thus, all modes of attack are resisted by the reinforced concrete panels cast with the improved metal fiber reinforced concrete composition of the invention.

In addition, the usual wiring for alarm systems, not shown, may be located in and cast in place in any panel as the panel is cast.

One of the vault door wall panels 16, FIGS. 1 and 2, is provided with a manhole opening 72 with a shouldered rectangular perimeter as indicated at 73 having an opening area large enough for service personnel to crawl through the opening into the vault. This opening normally is closed by a plug cast with the reinforced concrete composition of the invention, diagrammatically indicated at 74. The plug 74 has a complementary shape to fit into the opening 72-73, and such plug is bolted to the panel 16 from the inside of the vault when the vault is erected. Bolts may engage the ends of a strap spanning the plug inside the vault compartment, and the bolts are threaded into nuts such as the nuts 44 in recesses 40, similar to those shown in FIG. 7. The plugged manhole opening 72 is provided to gain authorized access to a vault when a lockout condition may arise.

In such event, the plug concrete is destroyed by being pulverized by hammer attack. Authorized personnel then may crawl through the manhole 72 and determine the cause of and repair the lockout condition so that the vault door may be opened and operation of the door lock restored to normal condition.

Then a new plug 74 is inserted in the opening 72 and again held in place by a strap, not shown, bolted to the embedded panel nuts 44 in recesses 40.

The recesses 40 with communicating nuts 44 integrated in the panels at locations along the panel surfaces 41 as shown in FIGS. 1 to 7 have important functions. These recesses 40 are located adjacent to similar recesses in adjacent panels in the various assembled vault walls as shown in FIG. 1.

For example, in FIG. 1 metal clips or straps 75 are shown spanning the joints between adjacent assembled panels of vault back wall 7, vault side wall 12 and vault bottom wall 3. Bolts 76 are indicated diagrammatically by circles which bolt the straps 75 to the embedded nuts 44 of adjacent panels.

Similarly, angle metal clips 77 are illustrated in FIG. 1 received in recesses 40 of adjacent panels and may be similarly bolted to the embedded nuts 44 in the adjacent panels to span the joints and lock the adjacent panels to one another.

This assembly procedure enables the various vault wall components illustrated in FIG. 1 to be assembled to form an integrated protective vault.

The vault door opening between panels 16 and 17 of the vault door wall 15 may be equipped with any usual vault door mounted in the usual manner. A vault door formed of panels similar to those used in the various vault walls may be used.

The vault side walls 11 have been described as being shorter in length than the back wall 7 and door wall 15. This relationship permits the bottom, side, door and top vault walls 3, 11, 15 and 22 to be assembled and then finally closed by the back vault wall 7. In this manner, where it may be desired to increase the vault size of a vault constructed in accordance with the invention, the back vault wall 7 may be removed and additional panels added at the rear of the bottom, side and top vault walls 3, 11 and 22 and then the back vault wall may be replaced.

FIGS. 21, 22 and 23 diagrammatically illustrate the basic steps in the procedure for casting and handling any panel with the steel fiber reinforced concrete composition of the invention. Various components of a mold are illustrated (FIG. 21) as rectangles with the mold extending flatwise on a support surface 78 on which it may be vibrated during the casting procedure.

Rectangles 28A, 29A, 30A, 31A and 32A represent, respectively, a mold bottom wall, the two mold side walls and the two mold end walls. The side and end walls are connected by hinges represented by heavy lines 33A. The mold walls are in cavity-forming position in FIG. 21 ready to receive the new concrete composition mixed and in a sufficiently fluid state while being agitated to be poured into the cavity wherein it is permitted to set and cure to form the panel diagrammatically indicated at 79 in FIG. 22.

Despite the low water-cement ratio, the new concrete easily consolidates with the aid of external vibration which is continued by vibrating the mold as the concrete is being poured and until the concrete is level in the mold. After curing, the mold side and end walls are opened pivotally outward to enable the cast panel 79 to be removed from the mold.

The top of the cast panel 79 has several semispherical recesses 56 therein, as described, rendering accessible the heads 55 of dumbbells which may be engaged by forked lifting hooks connected by a cable 80 (FIG. 23) to a hoist mechanism cable 81. This permits a panel 79 readily to be conveyed to a place of storage or assembly to construct a vault.

Various tests that have been conducted on cast and cured steel fiber reinforced concrete having the described composition indicate that the concrete is the toughest concrete from the standpoint of thickness comparisons of any attack resistant concrete that has been tested. A reason for this superior performance of the new concrete is the combination of high cement content, extraordinarily low water-cement ratio, and extraordinarily high steel fiber content.

In comparing the unique properties of the cast panels, it is noted that conventional vaults formed of reinforced cast-in-place concrete material have whatever concrete composition is provided by the contractor. Such cast-in-place conventional reinforced concrete vault walls are not known to have been tested after curing and removal of forms and in vault configuration for resistance to burglarious attack to determine the degree of protection actually present.

Such deficiencies are absent with the multiple panel vault wall construction of the invention, since the panels are cast individually at a plant where quality control provisions, inspection, etc. can be exercised, thus assuring of the level of protection provided in a vault constructed of such panels as described.

Accordingly, the concepts of the various aspects of the invention described in detail provide a new steel fiber reinforced concrete composition modular panel product for vault construction, new methods of casting the described composition into panels, new molds enabling panels to be cast in the flat and self-level to provide reinforced concrete panels having the unique physical properties and protective characteristics described, all of which achieve the stated objectives, eliminate cast-in-place prior vault construction deficiencies and obtain the described new results.

These new results, some of which are set forth above involve characteristics of the formulation which resists burglarious attack as outlined in Underwriters Laboratories Standard No. 608 in thicknesses of 8 inches for one hour and 11 inches for 2 hours. The high amount of steel fiber, the high compressive strength (12,000–15,000 psi), and the high density of the security concrete provides superior resistance to the impact hammer and the oxy-acetylene torch. The impact hammer (electric) cannot penetrate the material to a point that chunks can be removed. The hammer actually has to powder the concrete. The torch has little effect even when a fluxing rod is used in conjunction with the torch.

In the foregoing description certain terms have been used for brevity, clearness and understanding, but no unnecessary limitations are to be implied therefrom, beyond the requirements of the prior art, because such terms are used for descriptive purposes and are intended to be broadly construed.

Moreover, the description and illustration of the invention are by way of example, and the scope of the invention is not limited to the exact details shown or described.

Having now described the features, discoveries and principles of the invention, the manner in which the panels are constructed and formulated, and the advantageous, new and useful results obtained, the new and useful structures, devices, elements, arrangements, compositions, methods, procedures and steps are set forth in the appended claims.

We claim:

1. A burglar resistant castable concrete panel construction for assembly into an integrated secure vault, wherein the improvement comprises:

a concrete composition which can be fully consolidated when cast with water to cement ratios less than 0.30 and steel fiber content of 7.21% to 7.73% by weight, consisting essentially of:

| Constituents | Weight % |
|---|---|
| Portland Cement wherein said cement is selected from the group consisting of Type I and Type III Portland Cement; | 18.88 to 19.81 |
| Fly Ash wherein said fly ash is selected from the group consisting of Glass F and Class C fly ash; | 1.37 to 1.45 |
| Fine Aggregate (SSD); | 39.12 to 40.86 |

-continued

| Constituents | Weight % |
|---|---|
| Gravel wherein said gravel is selected from the group consisting of No. 8 gravel and crushed stone, (SSD); | 25.12 to 26.53 |
| Water; | 4.81 to 5.15 |
| Melamine Superplasicizing Water-Reducing Admixture; and, | 0.96 to 1.04 |
| Steel fibers; | 7.21 to 7.73. |

2. The modular panel construction according to claim 1 wherein the steel fibers have the nominal dimensions of 0.016 inches diameter×0.75 inches long±¼ inch.

3. The modular panel construction according to claim 1 wherein fused $Al_2O_3$ is substituted for the Gravel constituent.

4. The modular panel construction defined in claim 2 in which the concrete composition has such resistance to impact hammer attack that no such panel in a vault wall of an integrated vault formed of multiple such panels can have chunks of the concrete removed to penetrate said panel to form a 96 square inch attack-available opening in such vault wall panel; and in which such 96 square inch opening cannot be formed in an 8 inch thick vault wall panel in one hour and in an 11 inch thick vault wall panel in two hours by impact hammer attack to reduce the concrete to powder.

5. The modular panel construction defined in claim 2 in which attack by an oxy-acetylene torch has little effect in penetrating a vault wall panel even when a fluxing rod is used in conjunction with the torch.

6. The modular panel construction defined in claim 2 in which a plurality of layers of 4 inch spaced re-bar mesh mats formed of ⅝ inch diameter steel bars are located within the cast steel fiber reinforced concrete; and in which a vault wall panel resists formation of a 96 square inch attack-available opening through the panel by diamond-core drill attack in an 8 inch thick panel in one hour and in an 11 inch thick panel in two hours.

7. The modular panel construction defined in claim 2 in which spaced complementary overlap formations are molded in surfaces of each panel adapted for complementary engagement with overlap formations in other panels when multiple panels are assembled to construct a vault, to thereby provide overlapped joints between adjacent vault wall panels.

8. The modular panel construction defined in claim 2 in which connector means are cast in said panels at spaced locations accessible at panel inner vault chamber surfaces for connection with panel tie-lock means spanning joints within the vault between adjacent panels of multiple panels assembled to construct an integrated vault.

9. The modular panel construction defined in claim 2 in which a manhole opening is molded in one panel of multiple panels adapted to be assembled to construct a vault; in which a manhole plug is provided for closing said manhole opening with lock means engageable within the vault to lock said manhole plug in said manhole opening, whereby said manhole plug may be destroyed to gain access to a lock-out vault for correcting the lock-out status and for replacement of a new plug in said manhole opening and locking said new plug in closure position.

10. The method of mixing and casting a metal fiber reinforced concrete composition which can be fully consolidated when cast with water to cement ratios less than 0.30 and steel fiber content of 7.21 to 7.73% by weight, consisting essentially of:

| Concrete Constituents | [*] [lb/yd$^3$] | Weight % |
|---|---|---|
| Portland Cement - One of the Class Consisting of Type I and Type III Portland Cement | [830.5 to 847.5] | 18.88 to 19.81 |
| Fly Ash - One of the Class Class Consisting of Class F and Class C Fly Ash | [60.4 to 61.6] | 1.37 to 1.45 |
| Fine Aggregate (SSD) | [1700 to 1769] | 39.12 to 40.86 |
| Gravel - One of the Classes Consisting of No. 8 Gravel and Crushed Stone (SSD) | [1098 to 1142] | 25.12 to 26.53 |
| Water | [212 to 220] | 4.81 to 5.15 |
| Melamine Super-plasticizing Water-Reducing Admixture | [678 to 706] | 0.96 to 1.04 |
| Steel Fibers [— (0.016 in. diameter × ¾ in. long ± ¼ inch.)] | [317.5 to 330.5] | 7.21 to 7.73 |

[*ounces rather than lbs]

in a rotatable tumbling concrete mixer to form a castable mixture which may be poured from the mixer into an open top of a generally flat five-sided mold to form a modular panel for multiple panel assembly of an integrated security vault, including the steps of:

(a) introducing said Cement, Fly Ash, Fine Aggregate, Gravel and Water constituents in the stated proportions into such mixer;

(b) then rotating said mixer to tumble and agitate said constituents in the mixer until a mass of crumbly, damp, powder and aggregate is formed;

(c) then adding said Admixture to said mass and continuing mixer rotation until the constituents reach a state of high fluidity;

(d) then adding the Steel Fiber constituent while continuing rotation and agitation of the mixed constituents until a fully integrated mixture thereof is obtained; and (e) then pouring the integrated mixture into said mold while externally vibrating the mold to enable the integrated composition to fully consolidate in the mold.

11. The method defined in claim 10 in which mixer rotation is continued after adding the Admixture to said mass for about 1 to 5 minutes so that the constituents reach a state of high fluidity.

12. The method of casting a burglar resistant modular panel for multiple panel assembly of an integrated security vault having a castable metal fiber reinforced concrete composition which can be fully consolidated when cast with water to cement ratios less than 0.30 and steel fiber content of 7.21 to 7.73% by weight, consisting essentially of:

| Concrete Constituents | [*] [lb/yd$^3$] | Weight % |
|---|---|---|
| Portland Cement - One of the Class Consisting of Type I and Type III Portland Cement | [830.5 to 847.5] | 18.88 to 19.81 |
| Fly Ash - One of the Class Consisting of Class F and Class C Fly Ash | [60.4 to 61.6] | 1.37 to 1.45 |
| Fine Aggregate (SSD) | [1700 to 1769] | 39.12 to 40.86 |

-continued

| Concrete Constituents | [*] [lb/yd$^3$] | Weight % |
|---|---|---|
| Gravel - One of the Classes Consisting of No. 8 Gravel and Crushed Stone (SSD) | [1098 to 1142] | 25.12 to 26.53 |
| Water | [212 to 220] | 4.81 to 5.15 |
| Melamine Super-plasticizing Water-Reducing Admixture | [678 to 706] | 0.96 to 1.04 |
| Steel Fibers - [0.016 in. diameter × ¾ inch long ± ¼ inch.)] | [317.5 to 330.5] | 7.21 to 7.73 |

[*ounces rather than lbs.]

including the steps of:

(a) providing a rectangular mold cavity formed by a generally flat horizontally disposed mold bottom wall and separable side and end walls;

(b) while mixing and agitating said concrete composition in a rotatable concrete mixer, pouring said mixed concrete composition into said mold cavity while also externally vibrating said mold;

(c) then completely filling said mold cavity and permitting said metal fiber reinforced concrete composition in said mold cavity during continued mold vibration to consolidate;

(d) then curing said composition in said mold to form a modular panel having a flat top panel surface adapted to provide a flat vault wall outer surface portion when multiple panels are assembled to form a vault;

(e) providing complementary overlapped formations selectively on mold cavity bottom, side and end walls, adapted to mold complementary overlapped formations selectively on respective cured panel bottom, side and end surfaces;

(f) opening said mold cavity forming side and end walls to release said panel; and (g) removing said panel from said mold bottom wall for multiple panel assembly to form a vault.

13. The method defined in claim 12 in which a plurality of separate lift devices are embedded in the panel concrete during casting which devices have portions accessible at the inner and outer surfaces of the cast panel located adjacent each panel end and adapted to be coupled with transport means.

14. The method defined in claim 12 in which a plurality of recesses are formed at spaced locations along the side and end edges of the mold bottom wall surface of the cast panel during casting, adapted to receive connectors extending into similar recesses in adjacent panels and spanning joints between adjacent assembled vault wall panels; and in which threaded socket means is embedded in the concrete during casting communicating with each recess for bolting to such socket means a portion of a connector located in such recess to lock adjacent panels together across such spanned joints.

15. The method defined in claim 12 in which a plurality of separate lift devices are embedded in the panel concrete during casting which devices have portions accessible at the inner and outer surfaces of the cast panel located adjacent each panel end and adapted to be coupled with transport means; in which a plurality of recesses are formed at spaced locations along the side and end edges of the mold bottom wall surface of the cast panel during casting, adapted to receive connectors extending into similar recesses in adjacent panels and spanning joints between adjacent assembled vault wall panels; and in which threaded socket means is embedded in the concrete during casting communicating with each recess for bolting to such socket means a portion of a connector located in such recess to lock adjacent panels together across such spanned joints.

16. The modular panel construction defined in claim 2 in which the concrete composition has such resistance to impact hammer attack that no such panel in a vault wall of an integrated vault formed of multiple such panels can have chunks of the concrete removed to penetrate said panel to form a 96 square inch attack-available opening in such vault wall panel even when such impact hammer attack is accompanied by oxy-acetylene torch attack with a fluxing rod at the same time as the impact hammer attack.

17. The modular panel construction defined in claim 2 in which the concrete composition has such resistance to impact hammer attack that a 96 square inch attack-available opening cannot be formed in an 8 inch thick vault wall panel in one hour and in an 11 inch thick vault wall panel in two hours by impact hammer attack attempting to powder the concrete accompanied during such time intervals by oxy-acetylene torch attack with a fluxing rod in attempts to penetrate a vault wall panel.

18. The modular panel construction defined in claim 9 in which said manhole plug is formed of the same castable metal fiber reinforced concrete composition as that of the panel.

19. A burglar resistant castable concrete panel for assembly into an integrated secure vault, having a concrete composition which can be fully consolidated when cast with water to cement ratios less than 0.30 and steel fiber content of 7.21 to 7.73% by weight, consisting essentially of:

| Constituents | Weight % |
|---|---|
| Portland Cement wherein said cement is selected from the group consisting of Type I and Type III Portland Cement; | 18.88 to 19.81 |
| Fly Ash wherein said Fly Ash is selected from the group consisting of Class F and Class C Fly Ash; | 1.37 to 1.45 |
| Fine Aggregate (SSD); | 39.12 to 40.86 |
| Gravel wherein said gravel is selected from the group consisting of No. 8 gravel and crushed stone (SSD); | 25.12 to 26.53 |
| Water; | 4.81 to 5.15 |
| Melamine Superplasticizing Water-Reducing Admixture; and | 0.96 to 1.04 |
| Steel Fibers; | 7.21 to 7.73 |

prepared by a process comprising the steps of:

introducing together said Cement, Fly Ash, Fine Aggregate, Gravel and Water constituents in the foregoing proportions;

then mixing by mixing means said Cement, Fly Ash, Fine Aggregate, Gravel, and Water constituents until a mass of crumbly damp powder and aggregate develops;

then introducing said Admixture in the stated proportions to said mass;

then mixing by mixing means said mass and Admixture until said constituents reach a high fluidity state;

then introducing said Steel Fiber constituent in the stated proportions to the Admixture, Water, Gravel, Fine Aggregate, Fly Ash, and Cement constituents;

then mixing by mixing means said constituents until said constituents reach a fully integrated state;

then introducing said constituents into a mold; and, then vibrating the mold by a vibrating means whereby said fully integrated constituents fully consolidate in said mold.

20. The burglar resistant castable concrete panel according to claim 19 wherein the Steel Fibers have the nominal dimensions of 0.016 inches diameter×0.75 inches long±¼ inch.

21. The burglar resistant castable concrete panel according to claim 19 wherein said mold is a flat, five-sided rectangular mold having an open top.

22. The burglar resistant castable concrete panel according to claim 19 wherein fused $Al_2O_3$ is substituted for the Gravel constituent.

23. The method of mixing and casting a metal fiber reinforced concrete composition according to claim 10 wherein fused $Al_2O_3$ is substituted for the Gravel constituent.

24. The method of casting a burglar resistant modular panel for multiple panel assembly of an integrated security vault according to claim 12 wherein fused $Al_2O_3$ is substituted for the Gravel constituent.

* * * * *